(12) United States Patent
Luce

(10) Patent No.: US 9,643,712 B1
(45) Date of Patent: May 9, 2017

(54) THERMAL PROTECTION SYSTEM AND METHOD

(71) Applicant: Thomas L. Luce, El Segundo, CA (US)

(72) Inventor: Thomas L. Luce, El Segundo, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 65 days.

(21) Appl. No.: 14/931,579

(22) Filed: Nov. 3, 2015

(51) Int. Cl.
| | |
|---|---|
| *B32B 3/06* | (2006.01) |
| *B64C 1/40* | (2006.01) |
| *B32B 3/26* | (2006.01) |
| *B32B 3/08* | (2006.01) |
| *B32B 7/08* | (2006.01) |
| *B64G 1/58* | (2006.01) |

(52) U.S. Cl.
CPC .......... *B64C 1/40* (2013.01); *B32B 3/06* (2013.01); *B32B 3/085* (2013.01); *B32B 3/266* (2013.01); *B32B 7/08* (2013.01); *B32B 2307/304* (2013.01); *B32B 2307/56* (2013.01); *B32B 2605/18* (2013.01); *B64G 1/58* (2013.01)

(58) Field of Classification Search
CPC .... Y10T 428/24008; Y10T 428/24174; B64G 1/58; B64C 1/38; B64C 1/40; B64C 1/403
See application file for complete search history.

(56) References Cited

U.S. PATENT DOCUMENTS

| | | | | |
|---|---|---|---|---|
| 4,439,968 A | * | 4/1984 | Dunn | B64G 1/58 244/159.1 |
| 5,803,406 A | | 9/1998 | Kolodziej et al. | |
| 6,827,312 B2 | | 12/2004 | Riedell | |

FOREIGN PATENT DOCUMENTS

EP    1 741 981 A1    1/2007

* cited by examiner

*Primary Examiner* — Alexander Thomas
(74) *Attorney, Agent, or Firm* — Tarolli, Sundheim, Covell & Tummino LLP

(57) ABSTRACT

A system and method for restricting thermal transfer between an ambient space and a substructure include providing an inner mold line side (IML) surface to the substructure. A plurality of clevises extends upward from the IML surface. An outer mold line side (OML) surface is interposed between the ambient space and the IML surface. The OML surface includes at least one horizontally oriented wing and a plurality of horizontally oriented shoulders. The wing selectively engages at least two of the shoulders. A plurality of lugs extends downward from the OML surface. At least one aperture extends longitudinally through the OML surface to selectively permit fluid communication between the ambient space and the IML surface. A plug selectively substantially fills the aperture and is selectively secured to the IML surface. A fastener, configured to selectively secure the OML surface to the IML surface, extends horizontally through the clevises and the lugs.

22 Claims, 12 Drawing Sheets

THERMAL PROTECTION SYSTEM AND METHOD

TECHNICAL FIELD

This disclosure relates to an apparatus and method for use of a thermal protection system and, more particularly, to a system and method for restricting thermal transfer between an ambient space and an outer surface of an aircraft.

BACKGROUND

A thermal protection system (TPS) may be used to protect vehicles from high temperatures. Primary TPS locations include hot outer skins or propulsion path and exhaust-washed structures. The current operational state of the art remains primarily those technologies established in the space shuttle program. The shuttle-related TPS technologies are often not robust enough for use with military vehicles and missions. Future high-speed military vehicles need affordable and robust, yet still effective TPS. It is also noted that TPS technologies may be used to protect a vehicle from low ambient temperatures.

SUMMARY

In an embodiment, a thermal protection system is described. An inner mold line side assembly is provided for selective connection with a substructure. The inner mold line side assembly has a plurality of clevises extending longitudinally in a first direction when connected to the substructure. An outer mold line side assembly is oppositely disposed to the inner mold line side assembly. The outer mold line side assembly is selectively connected to the inner mold line side assembly in an operative configuration. The outer mold line side assembly has a plurality of lugs extending in a second direction, opposite the first direction. The lugs each are configured for selective placement laterally adjacent the clevises in the operative configuration. The outer mold line side assembly includes a first outer mold line part and a second outer mold line part. The first outer mold line part has an aperture extending longitudinally therethrough and permitting selective access to the inner mold line side assembly. The first outer mold line part includes at least one horizontally oriented wing configured to selectively engage horizontally oriented shoulders of the second outer mold line part. A plug substantially fills the aperture of the first outer mold line part in an operative configuration. The plug is selectively secured to the inner mold line side assembly. A fastener extends horizontally through the clevises and the lugs, when laterally adjacent to one another. The fastener is configured to selectively secure the outer mold line side assembly to the inner mold line side assembly.

In an embodiment, a method of thermally insulating a substructure from an ambient space is provided. An inner mold line side assembly having a plurality of clevises extending longitudinally in a first direction is provided. The substructure is selectively connected with a portion of the inner mold line side assembly spaced apart from the plurality of clevises to place the inner mold line side assembly in an operative configuration. An outer mold line side assembly having a plurality of lugs extending in a second direction, opposite the first direction, is provided. The outer mold line side assembly includes a first outer mold line part and a second outer mold line part. The first outer mold line part has an aperture extending longitudinally therethrough. The first outer mold line part includes at least one horizontally oriented wing. The second outer mold line part includes a plurality of horizontally oriented shoulders. The outer mold line side assembly is placed in opposite disposition to the inner mold line side assembly and engages the horizontally oriented shoulders of the second outer mold line part with at least one horizontally oriented wing of the first outer mold line part to place the outer mold line side assembly in the operative configuration with the horizontally oriented shoulders of the second outer mold line part and the at least one horizontally oriented wing of the first outer mold line part being longitudinally interposed between the ambient space and the inner mold line side assembly. With the aperture extending through the first outer mold line part, selective access to the inner mold line side assembly is permitted when the outer mold line side assembly is in the operative configuration. The aperture of the first outer mold line part is substantially filled with a plug to selectively block access to the inner mold line side assembly through the aperture. The plug is selectively secured to the inner mold line side assembly. Each of the lugs is placed laterally adjacent at least one clevis. The outer mold line side assembly is connected to the inner mold line side assembly. A fastener is extended horizontally through a plurality of the clevises and the lugs, when laterally adjacent to one another, to selectively secure the outer mold line side assembly to the inner mold line side assembly. At least one of the plug, the connection between the outer mold line side assembly and the inner mold line side assembly, and the relative positioning of the lugs and clevises is operative to prevent thermal energy transfer between the substrate and the ambient space.

In an embodiment, a system for restricting thermal transfer between an ambient space and an outer surface of an aircraft is described. A substantially planar inner mold line side surface is provided. The inner mold line side surface is attached to the outer surface of the aircraft. A plurality of clevises extends longitudinally upward from the inner mold line side surface. A substantially planar outer mold line side surface is longitudinally interposed between the ambient space and at least a portion of the inner mold line side surface. The outer mold line side surface is at least partially comprised of at least one horizontally oriented wing and a plurality of horizontally oriented shoulders. The at least one horizontally oriented wing selectively engages at least two of the horizontally oriented shoulders. A plurality of lugs extends longitudinally downward from the outer mold line side surface. Each lug is directly laterally adjacent at least one clevis. At least one aperture extends longitudinally through the outer mold line side surface. The aperture selectively permits fluid communication between the ambient space and the inner mold line side surface. A plug selectively substantially fills the aperture. The plug is selectively secured to the inner mold line side surface. A fastener extends horizontally through the clevises and the lugs, when laterally adjacent to one another. The fastener is configured to selectively secure the outer mold line side surface to the inner mold line side surface.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "directly adjacent" another feature may have portions that overlap or underlie the adjacent feature, whereas a structure or feature that is disposed "adjacent" another feature may not have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

Figure 1:
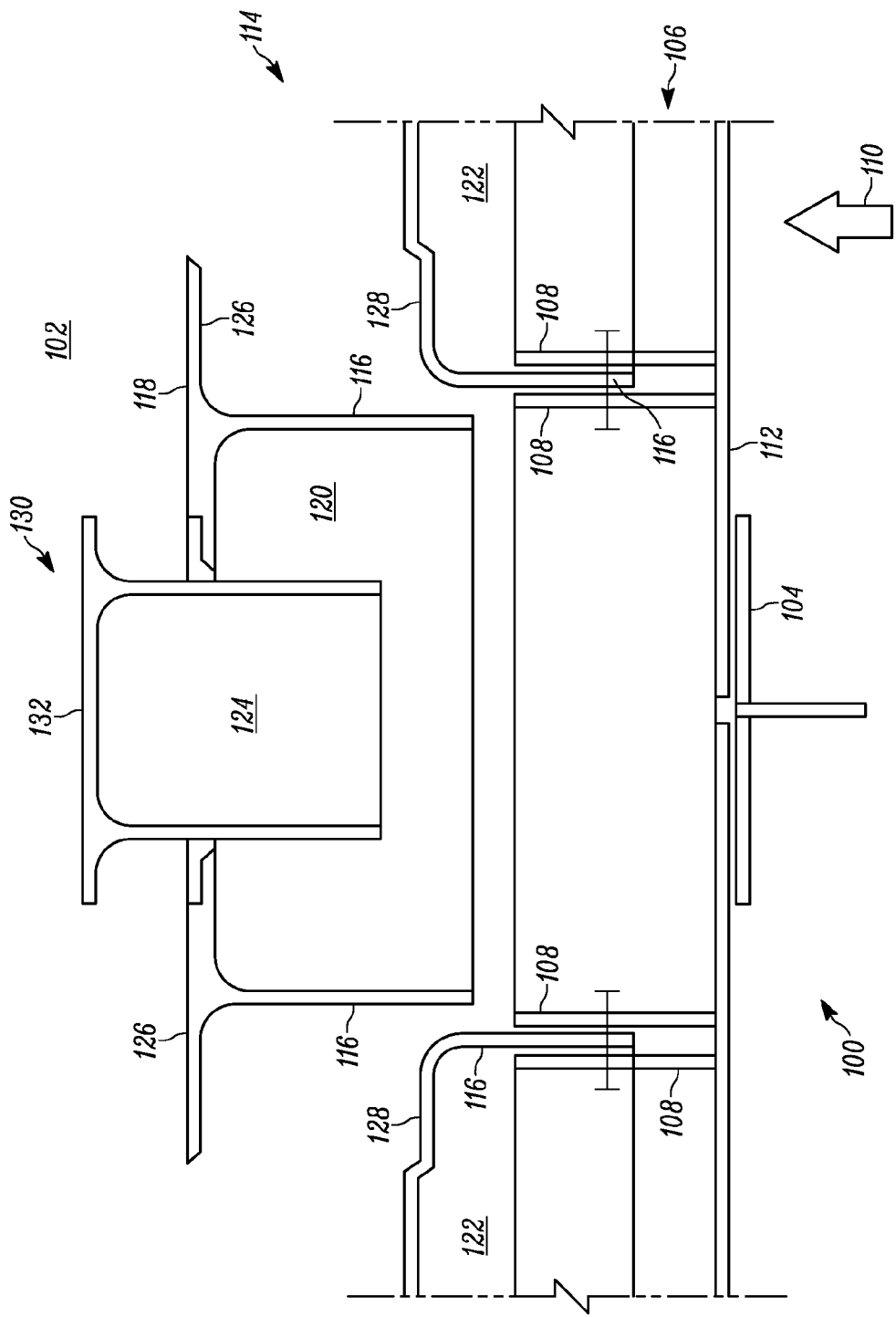
FIG. 1 is a schematic exploded side view of one aspect of the invention.

FIG. 1 depicts a thermal protection ("TPS") 100 for use in restricting thermal transfer between an ambient space 102 and an underlying substructure 104. The thermal transfer can be in either direction across the TPS 100, but the TPS 100 will be described herein as insulating a "cool side" substructure 104 from a "hot side" ambient space 102. In addition, a TPS 100 may be used in any use environment, including, but not limited to, automotive, industrial, aviation, commercial, and consumer applications, but will be described here as being used on an aerospace vehicle.

Optionally, the TPS 100 may have the ability to assist with carrying a portion of the structural load of the substructure 104 (e.g., a vehicle structural load). In contrast, prior art "bolted-on" insulation systems—e.g., the insulating blankets and tiles on the space shuttle—are entirely "parasitic", and carry no vehicle loads. The only loads parasitic insulation systems carry are those loads needed to support the weight of the system itself, which does not include assisting other vehicle structures with structural support/loads. However, the TPS 100 is able to assist with carrying vehicle structural loads due to the way the various structures of the TPS 100 interlock and reinforce one another, as will be discussed further below.

The TPS 100 includes an inner mold line side assembly 106 for selective connection with the substructure 104. The inner mold line side assembly 106 has a plurality of clevises 108, with each clevis 108 extending longitudinally in a first direction (shown at arrow 110 in FIG. 1) from an inner mold line base 112 when the TPS 100 is connected to the substructure 104. The term "longitudinal" is used herein to indicate a direction substantially parallel with arrow 110 in FIG. 1—i.e., the vertical direction, in the orientation of FIG. 1.

The TPS 100 also includes an outer mold line side assembly 114 oppositely disposed to the inner mold line side assembly 106. The outer mold line side assembly 114 is selectively connected to the inner mold line side assembly 106 in an operative configuration, as will be discussed below with reference to at least FIGS. 2A-2B. The outer mold line side assembly 114 has a plurality of lugs 116, with each lug 116 extending in a second direction, opposite the first direction 110, as shown in FIG. 1. The lugs 116 are each configured for selective placement laterally adjacent the clevises 108 of the inner mold line side assembly 106 from an outer mold line cover 118 when the TPS 100 is connected to the substructure 104 in the operative configuration.

While the various structures and components of the TPS 100 may be made of any desired material(s), using any desired method(s), it is contemplated that a majority of the inner mold line side assembly 106 (and/or other "cold side" facing components) may be made from polymer matrix composite ("PMC") materials, such as for weight savings, and a majority of the outer mold line side assembly 114 (and/or other "hot side" facing components) may be made from ceramic matrix composite ("CMC") materials, such as for heat resistance.

In general, the temperature of the inner mold line side assembly 106 area is much "cooler" than the outer mold line side assembly 114 but is not necessarily "cold." One example use environment has the inner mold line side assembly 106 on a substructure 104 which is a cryogenic tank, holding cryogenic fluids such as liquid oxygen (oxidizer) at −321° F. or liquid hydrogen fuel at −423° F. However, more common expected "cool side" temperatures would be at those modestly-elevated temperatures attainable by epoxy or polyimide composites.

The kind of "Fiberglass" PMC materials found in many familiar commercial and consumer products (e.g., sporting goods equipment, boats, surfboards, patio furniture, building materials, car bodies, and the like) include glass fibers adhered (e.g., bonded/held/"glued") together within a polymer "matrix" such as epoxy and polyester. Carbon/epoxy and glass/polyester are possible examples of polymer matrix composite materials. Since space and military applications often demand much higher performance than that offered by glass reinforced PMCs like fiberglass, these use environments tend to use more of the high-performing and more expensive carbon/graphite fibers, but the basic fiber-reinforced polymer principles remains the same. It should be noted that graphite fibers represent a very special, relatively expensive, very high performance and quite small (volume-wise) subset of carbon fiber materials. In a PMC material, the reinforcing fibers may increase the polymer's robustness and other mechanical properties to be stronger or more durable.

Polymers also have relatively low inherent ability to perform at high temperatures. For example, very few polymers can operate at temperatures as high as 500-600° F. and none much higher than 600° F. Most of the commercially-important polymers operate at about 200-300° F. However, ceramics can be used at extremely high temperatures, which may be much higher than even steels can tolerate—at 3000° F. or even above. Ceramics can also be useful when chemical inertness is needed. Like polymers, however, ceramics also aren't nearly as mechanically robust without reinforcing fibers. Example CMCs which can be used with the TIPS 100 include carbon/carbon (C/C) and carbon/silicon carbide (C/SiC).

The outer mold line side assembly 114 may include a first outer mold line part 120 and a second outer mold line part 122. The first outer mold line part 120 may have an aperture 124 extending longitudinally therethrough. When present, the aperture 124 permits selective access to the inner mold line side assembly 106, such as for assisting with assembly/disassembly of internal structures of the TPS 100. The first outer mold line part 120 may include at least one horizontally oriented wing 126 configured to selectively engage horizontally oriented shoulders 128 of adjacent second outer mold line part(s) 122. The horizontally oriented wing 126 of the first outer mold line part 120 and the horizontally oriented shoulders 128 of the second outer mold line part(s) 122, may be configured for mutual engagement in the operative configuration such that the first outer mold line part(s) 120 and second outer mold line part(s) 122 collectively provide the outer mold line side assembly 114 with a substantially planar outermost outer mold line assembly cover 118 surface.

Optionally, and as shown in FIG. 1, the wing(s) 126 and shoulder(s) 128 may have beveled edges or otherwise be configured to fit together smoothly and thus maintain the substantially planar nature of the outer mold line cover 118 surface in a substantially uninterrupted (e.g., by a lip or seam) manner. When present, a substantially uninterrupted outer mold line cover 118 surface may assist, for example, with reducing at least one of aerodynamic drag and heat buildup during use. It is also contemplated that the second outer mold line part 122 could include a wing 126 and/or the first outer mold line part 120 could include a shoulder 128, as desired for a particular use environment.

A plug 130 may be provided to substantially fill the aperture 124 of the first outer mold line part 120 in an operative configuration. When present, the plug 130 may be selectively secured to the inner mold line side assembly 106. The plug 130 may assist, in combination with the aperture 124, with providing selective access from the ambient space 102 to the inner mold line side assembly 106, such as to assist with assembly of the TPS 100 and/or attachment of at least portions of the TPS 100 to the substructure 104. Optionally, and as shown in FIG. 1, the plug 130 may include a substantially planar plug cap 132, optionally including beveled edges (not shown), that assists with maintaining the substantially planar nature of the outer mold line cover 118 surface.

Figure 2A:
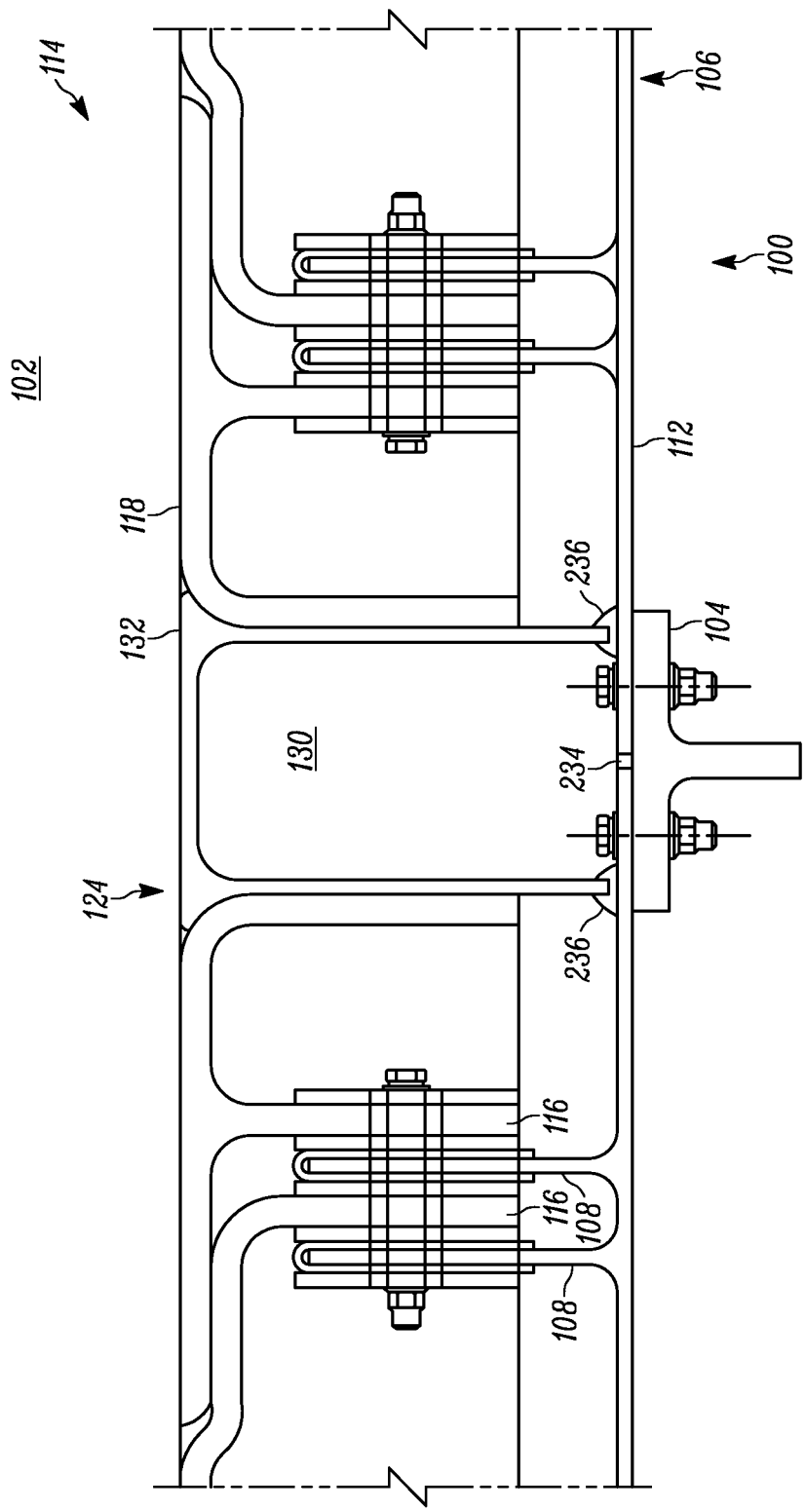
FIG. 2A is a schematic side view of the aspect of FIG. 1 in a first configuration.

At least a portion of the plug 130 may be selectively frangibly connected to the inner mold line side assembly 106. For example, and as shown in FIG. 2A, a lower rim 234 of a substantially cylindrical plug 130 could be adhered to an appropriate surface of the inner mold line base 112, such as to a portion of the inner mold line base 112 directly longitudinally below the aperture 124. Optionally, the frangible connection between the plug 130 and the inner mold line side assembly 106 could be made via a caulk or other adhesive 236. As discussed below, the adhesive 236 or other frangible connection could be used to selectively hold the plug 130 in a desired use configuration until such time as the adhesive is broken or otherwise overcome, likely via substantially longitudinally upward tensile force, so that the plug 130 can be at least partially removed from the aperture 124.

Figure 2B:
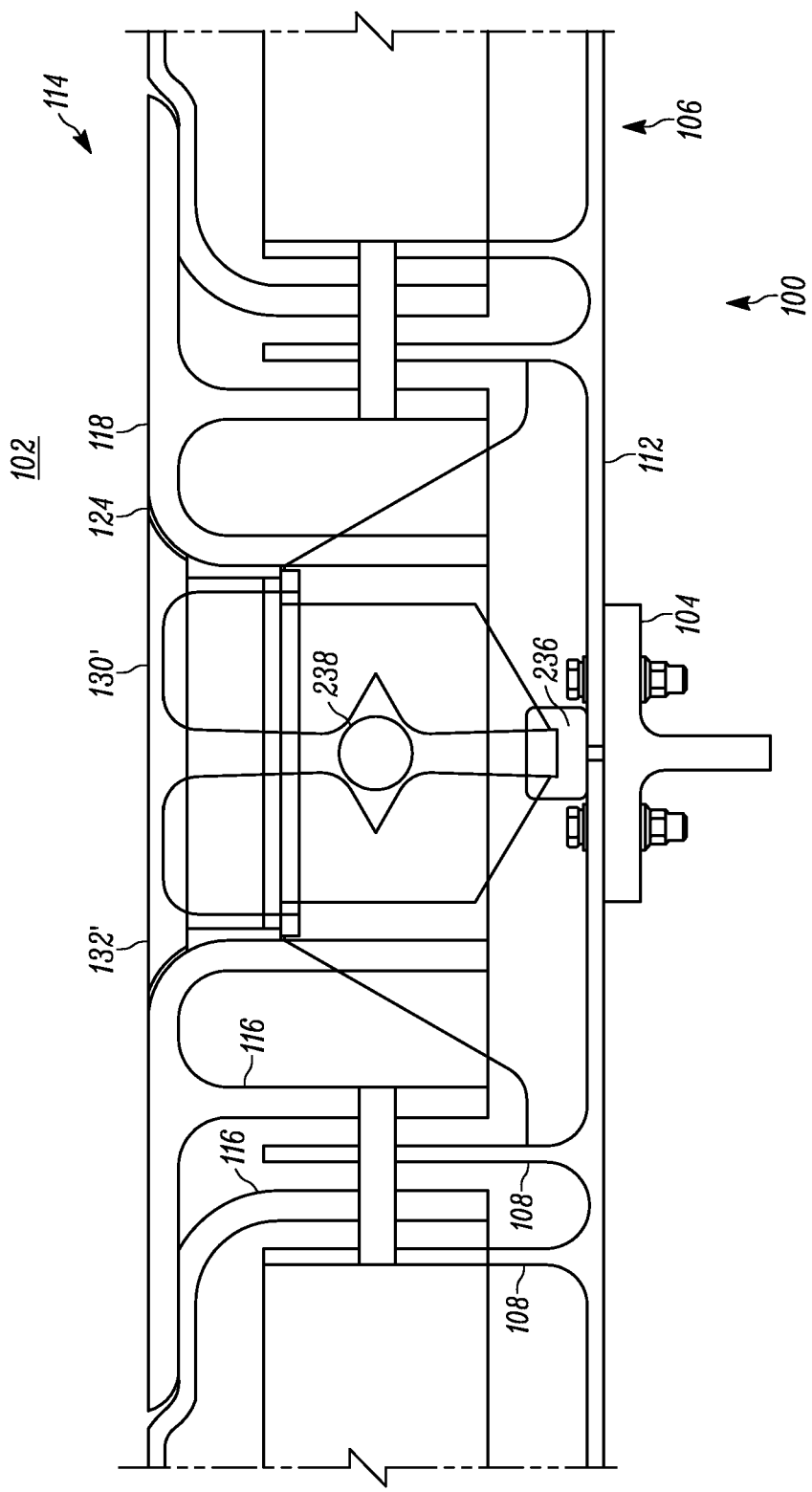
FIG. 2B is a schematic side view of the aspect of FIG. 1 in a second configuration.

As another plug design option, shown in FIG. 2B, the plug 130' could have a substantially cylindrical head including the plug cap 132' surface, with a relatively narrow plug stem 238 supporting the head in an "umbrella"-like manner. A lowermost end of the plug stem 238 may be attached to the inner mold line side assembly 106 via an adhesive 236 or any other suitable attachment mechanism. The frangible connection between the plug 130' and the inner mold line side assembly 106 could be made via a releasable/breakable adhesive 236. However, it is also contemplated that the adhesive 236 connection between the plug 130 or 130' and inner mold line side assembly 106 could be substantially permanent, and that the stem 238 or another structure of the plug 130 or 130' itself could fracture or release under tensile force (optionally in a permanent/destructive manner, permitting only one-time-use of the plug 130 or 130') to release the plug cap 132' surface for removal from the aperture 124. In the below description, the element number 130 is used to reference either the FIG. 2A or FIG. 2B style of plug, for ease of description, but could refer to any other suitable plug for a particular use environment of the TPS 100.

Figure 3:
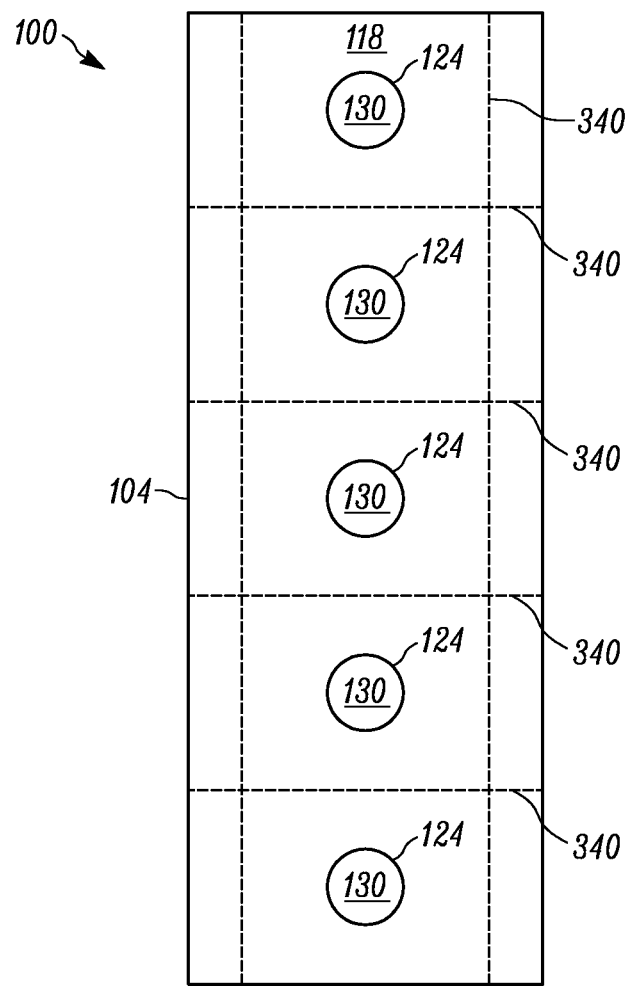
FIG. 3 is a top view of the aspect of FIG. 1 in an example use environment.

FIG. 3 is a top view of a substructure 104 having a TPS 100 attached thereto. In FIG. 3, the relatively smooth, substantially planar outer mold line side cover 118 is shown, with a plurality of apertures 124 (shown here as containing plugs 130) being provided to selectively permit fluid communication between the ambient space 102 and an inner mold line side surface (not shown, but discussed below). In FIG. 3, the plugs 130 are shown as being lined up along the outer mold line side cover 118, but no particular alignment is required, and the plugs 130 (along with their corresponding apertures 124) can be placed as desired for a particular use environment. FIG. 3 includes a dashed-line depiction of a plurality of inner walls 340, which will be described below as related to the internal structures of the TPS 100. Optionally, at least a portion of the clevises 108 and lugs 116 may comprise inner walls 340.

Figure 4:
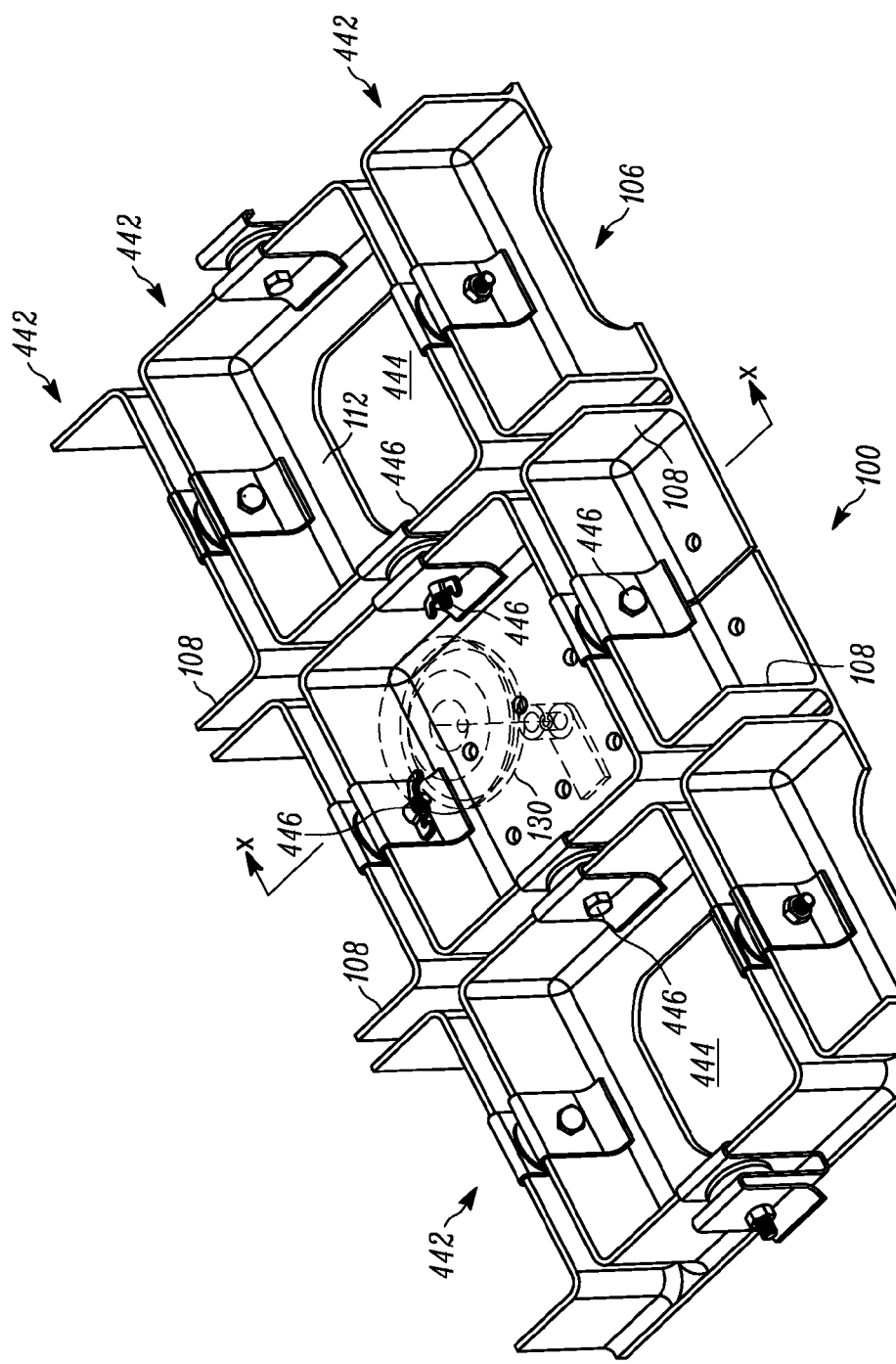
FIG. 4 is a top perspective view of the aspect of FIG. 1 in the second configuration.

The inner wall 340 structure is shown in greater detail in the partial perspective view of the TPS 100 shown in FIG. 4. FIG. 4 substantially depicts only the inner mold line side assembly 106, with the outer mold line side assembly 114 removed to show the internal structures of the TPS 100. The partial view of FIG. 4 includes a plurality of inner mold line side units 442. Each inner mold line side unit 442 includes an inner mold line base 112 (shown here as having at least one curvilinear aperture 444 therein) and at least one inner wall 340. The apertures 444 could be used to save weight and material and to provide access as desired during fabrication, assembly, use/maintenance, and disassembly. The inner walls 340, extending substantially perpendicularly upward from the inner mold line bases 112 of the inner mold line side units 442, are also curvilinear and are shown as all being substantially the same height and thickness, which may assist with manufacturing and/or design. However, the dimensions of corresponding components of the inner mold line side units 442 could differ, either within the same unit or among/between different units, as desired for a particular use application.

For example, while the basic footprint of a single inner mold line side unit 442 in FIG. 4 is shown as being substantially rectangular, it is contemplated that inner mold line side units (not shown) having different footprint shapes/sizes, may be provided for a particularly use environment. As shown in FIG. 4, a plurality of inner mold line side units 442 are provided and may be installed in a tessellated manner, either regularly or irregularly. When the underlying substructure 104 is irregularly shaped, it may be desirable to have a variety of differently configured (e.g., triangular or other polygonal footprinted) inner mold line side units from which to choose, such as to conform to a non-rectangular portion of the substructure 104.

It should be noted that the clevises 108 and lugs 116 could each form at least a portion of an inner wall 340 of an inner or outer mold line side assembly 114 or 106. That is, the "arms" 108 and "lugs" 116, such as those shown in cross-section in, for example, FIG. 1, could merely be locally defined/described portions of inner walls 340 of an inner or outer mold line side assemblies 114 or 106, respectively. In other words, an clevis 108 could be all or part of an inner wall 340 of an inner mold line side assembly 114 and a lug 116 could be all or part of an inner wall 340 of an outer mold line side assembly 106. An clevis/leg 108/116 relationship or description need not extend to an entirety of the inner wall, but may describe just a portion of that inner wall functioning as the described clevis 108 or lug 116.

It is also contemplated that the inner mold line side units 442, or components thereof, may be simply or complexly shaped (e.g., curved), or otherwise have a three-dimensional profile that is different from the depicted substantially planar and rectilinear arrangement. For example, an inner mold line side unit 442 may have a "stepped" inner mold line base 112 to accommodate, even conform relatively closely to, a local protrusion or cavity in the substructure 104 while preserving a substantially smooth or even locally planar aspect to the TPS 100 as a whole. (In other words, the TPS 100, or components thereof, could be used to "smooth over" or reduce local unevennesses, such as ridges, crevices, etc., in a substructure 104.) It is contemplated that such shaping of the inner mold line side units 442 and/or other TPS 100 components might even extend to a substantially U-shape to fit, for example, over a wing's leading edge surface. In such "extreme shaping" conditions, one of ordinary skill in the art will understand that the directional references and relative descriptions of the TPS 100 components herein as being substantially planar, longitudinally/laterally oriented, or otherwise having some spatial property are used with reference to the simple, relatively rectilinear TPS 100 shown in the Figures. This person of ordinary skill in the art will be able to readily translate or interpret the descriptions herein to accommodate a TPS 100 arrangement that is skewed or distorted from the depicted configuration and understand how the described TPS 100 may be adapted (e.g., by being "locally" planar/above/lateral/etc., rather than globally) for use in a more complex substructure 102 shape, under the overarching teachings and principles of the present invention.

In FIG. 4, an example plug 130 is shown "floating" in a position corresponding to its operative configuration, as if it were being used to plug the aperture 124 in an outer mold line side assembly 114 (omitted from this Figure for clarity of depiction). FIG. 4 therefore shows how removal of the plug 130 can facilitate access from the ambient space 102 to a plurality of fasteners 446 that otherwise, without the aperture/plug 124/130 or other access scheme, would be concealed inaccessibly beneath the outer mold line cover 118.

Figure 5:
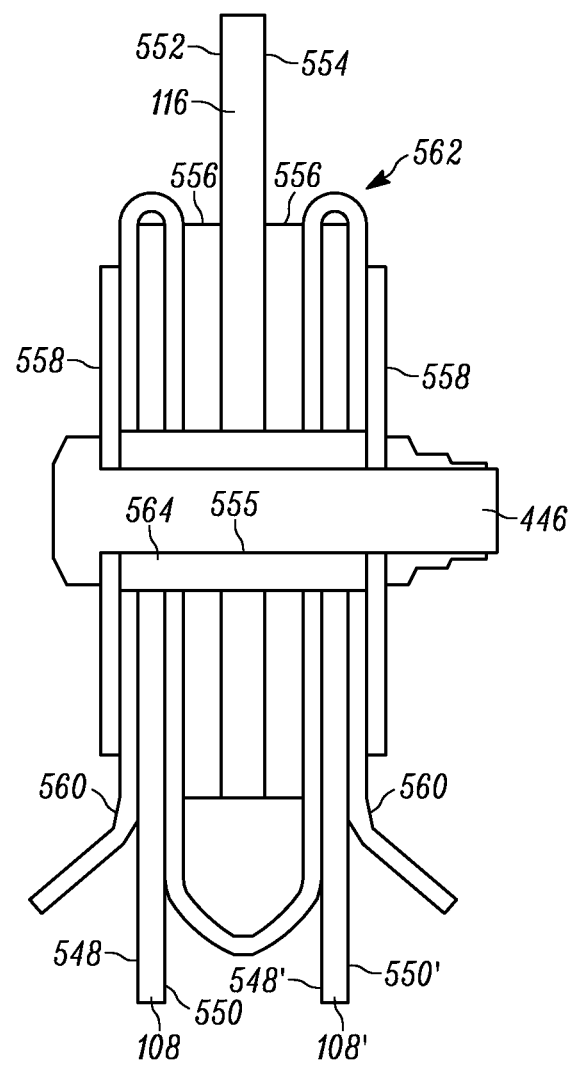
FIG. 5 is a side view of a component of the aspect of FIG. 1.

Any desired number and location (e.g., at the inner walls 340, inner mold line base 112, or any other suitable position) of fasteners 446 could be provided. As shown in FIGS. 4-5, a fastener 446 may extend horizontally through the clevises 108 and the lugs 116, when laterally adjacent to one another. In this manner, the fastener 446 associated with the clevises 108 and lugs 116 (as opposed to any fasteners 446 located elsewhere in the TPS 100) is configured to selectively secure the outer mold line side assembly 114 to the inner mold line side assembly 106. Any type, or combination of types, of fasteners 446 could be used with the TPS 100, such as, but not limited to, bolts (with or without nuts), screws, cotter pins, welds, adhesives, dowels, nails, retaining rings, staples, or any other suitable fastening mechanisms.

With particular reference to FIG. 5, each of the clevises 108 may be substantially planar and have longitudinally extending, laterally spaced, and oppositely facing first and second clevis faces 548 and 550, respectively. Each of the lugs 116 may be substantially planar and have longitudinally extending, laterally spaced, and oppositely facing first and second lug faces 552 and 554, respectively. As alluded to previously, the clevises 108 and lugs 116 shown in FIG. 5 may be merely partial cross-sections of inner walls 340 of the inner or outer mold line side assemblies 114 or 106. The term "longitudinally extending" is used here to reference a vertical direction in the plane of FIG. 5. The term "laterally spaced" is used here to reference a horizontal direction in the plane of FIG. 5. It is also contemplated that the clevises 108 and lugs 116 may have some transverse depth (i.e., into and out of the plane of FIG. 5) at least sufficient to allow fastening with an appropriate fastener 446. This dimensioning and other arrangements and configurations of the TPS 100 may be provided by one of ordinary skill in the art for a particular use environment.

When laterally adjacent to one another, the clevises 108 and lugs 116 may be arranged with a chosen one of the first and second clevis faces 548 and 550 laterally adjacent to a chosen one of the first and second lug faces 552 and 554. In other words, a plurality of clevises 108 and lugs 116 may be mutually interleaved, with a chosen one of the first and second clevis faces 548 and 550 of a selected clevis 108 being laterally adjacent to a second lug face 554 of a first lug 116 while an other one of the first and second clevis faces 548 and 550 of the selected clevis 108 is laterally adjacent to a first lug face 552 of a second lug 116. Likewise, and with reference to the specific element numbering of FIG. 5, a chosen one of the first and second lug faces 552 and 554 of a selected lug 116 could be laterally adjacent to a second clevis face 550 of a first clevis 108 while an other one of the first and second lug faces 552 and 554 of the selected lug 116 is laterally adjacent to a first clevis face 548' of a second clevis 108'. One of ordinary skill in the art will be able to provide, and place laterally adjacent one another, any desired number of clevises 108 and lugs 116 in a particular use environment. A fastener 446 can then be placed into suitable engagement (e.g., through an existing or self-forming fastener hole 555) to secure the inner and outer mold line side assemblies 114 and 106 together as desired, in a "stack", as shown in FIG. 5

Optionally, and as shown in FIG. 5, at least one spacer 556 and/or washer 558 may be provided to the "stack" for vibration damping, thermal insulation, electrical insulation, magnetic insulation, structural reinforcement, dimensional adjustment, or any other desired reason, and may be specified for a particular use environment of the TPS 100. Engineering these bolted/fastened joints will require special attention and will be strongly dependent on specific requirements for particular areas/applications. For example, one or more spacers 556 and/or washers 558 in a particular use environment may be provided as heat sinks and/or to help distribute the clamping load of a bolt head and nut over a larger area of the joint, thus reducing stresses on the materials of the inner and outer mold line side assemblies 114 and 106.

As another example, and as shown, insulating surfaces 560 may be interposed laterally between the clevises 108 and the lugs 116 to substantially prevent mutual contact therebetween. While the spacers 556 and washers 558 may also be considered insulating surfaces 560, the insulating surfaces 560 could also or instead comprise a monolithic unitary M-clip 562. The M-clip 562 shown is a single piece, which may assist with manufacturing and/or installation, and optionally includes flared laterally outermost surfaces, as shown, to assist with guiding the mutual interleaving engagement of the clevises 108 and lugs 116. Optionally, and as shown in FIG. 6, the M-clip 562 could be dimensioned in a "spring-type" manner to frictionally engage with at least one clevis 108 or at least one lug 116, to facilitate holding together of the "stack" of joint components while the other of the clevis(s) 108 or lug(s) 116 are assembled together with that "stack".

Figure 6:
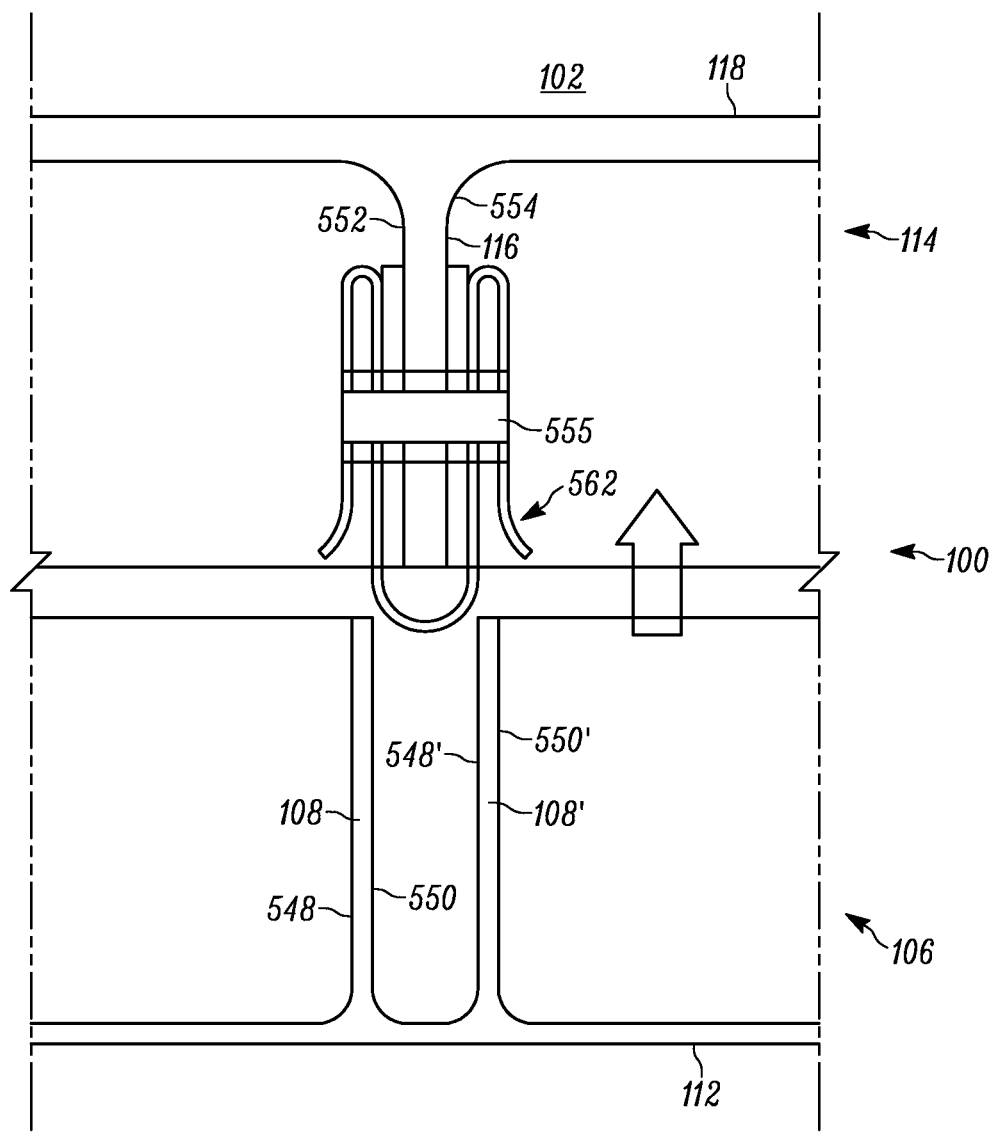
FIG. 6 is a partial schematic exploded side view of the aspect of FIG. 1.
Figure 7:
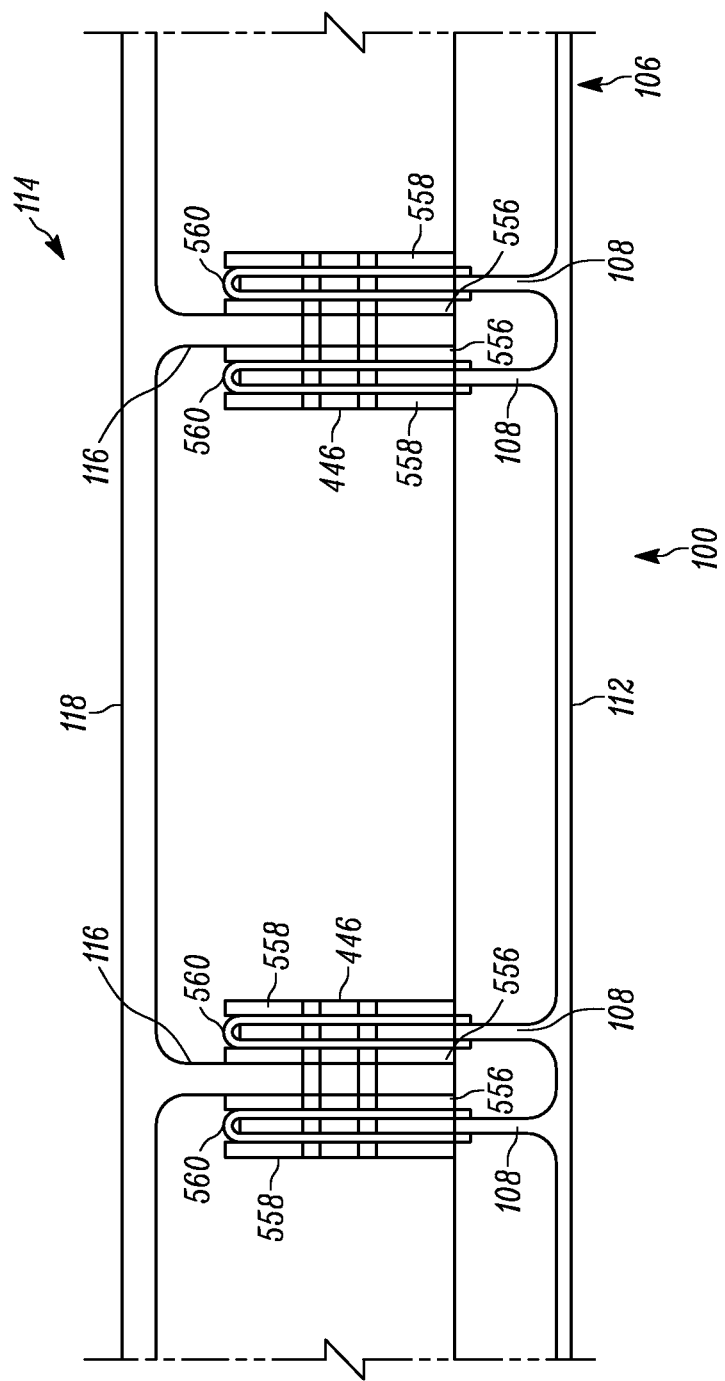
FIG. 7 is a schematic side view of the aspect of FIG. 1.

FIG. 7 shows an alternative option for use with or instead of the M-clip 562, with U-shaped insulating surfaces 560 being provided atop the clevises 108, similarly to the way the M-clip 562 is frictionally fit onto the lug 116 for assembly in FIG. 6. Regardless of the format or configuration of the insulating surface(s) 560, when present, the insulating surface(s) 560 may assist with isolating the inner and outer mold line side assemblies 106 and 114 from mutual contact.

With reference back to FIG. 5, a bushing 564 could be provided through a fastener hole 555 or otherwise around at least a portion of a shank of the fastener 446, to provide desired vibration damping; magnetic, electrical; or thermal insulation; or for any other purpose, including isolating the inner and outer mold line side assemblies 106 and 114 from mutual contact, to further stem heat flow through the fastener 446 to adjacent structures, and/or to reduce stress concentrations within the joint itself.

As depicted in FIG. 7, when laterally adjacent to one another in the operative configuration, the clevises 108 may be spaced apart from direct longitudinal contact with the outer mold line side assembly 114, and the lugs 116 may be spaced apart from direct longitudinal contact with the inner mold line side assembly 106. Stated differently, some combination of (when present) the fastener 446, insulating surface 560, M-clip 562, or any other portions of the joint "stack" at least partially shown in FIG. 5 may assist with "suspending" the outer mold line side cover 118 above the inner mold line base 112, and avoiding any direct contact between the inner and outer mold line side assemblies 106 and 114, which may be helpful in reducing electrical, magnetic, thermal, mechanical, or other energy flow paths between the inner and outer mold line side assemblies 106 and 114.

Figure 8:
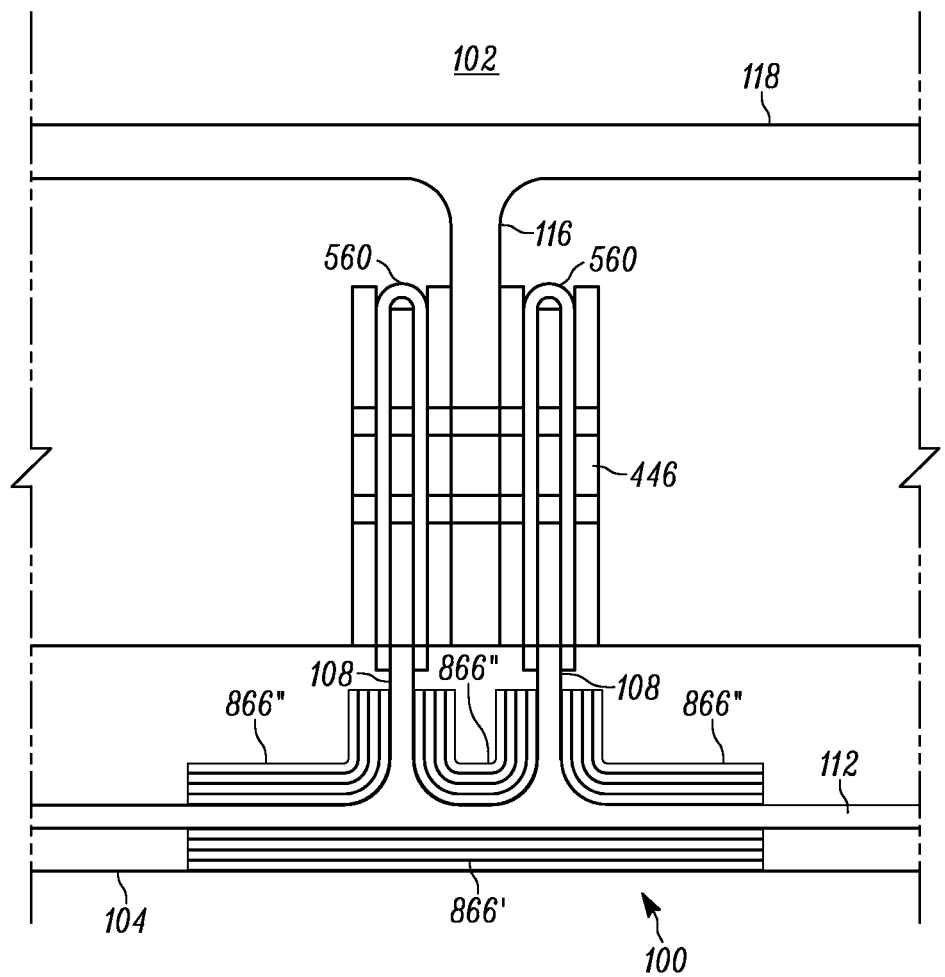
FIG. 8 is a side view of a component of the aspect of FIG. 1.

At least one damper 866 may also be provided to any configuration of the TPS 100 to assist with at least one of electrical, magnetic, thermal, mechanical, or other damping or insulation as desired. For example, and as shown in FIG. 8, a first damping structure 866' may be interposed longitudinally between, and directly contact both of, the substructure 104 and the inner mold line side assembly 114. A second damping structure 866" may be interposed longitudinally between the inner mold line side assembly 114 and the outer mold line side assembly 106. While the second damping structure 866" may directly contact the inner mold line side assembly 114, there is no direct contact required (though such is not prohibited) between the second damping structure 866" and the outer mold line side assembly 106.

Figure 9A:
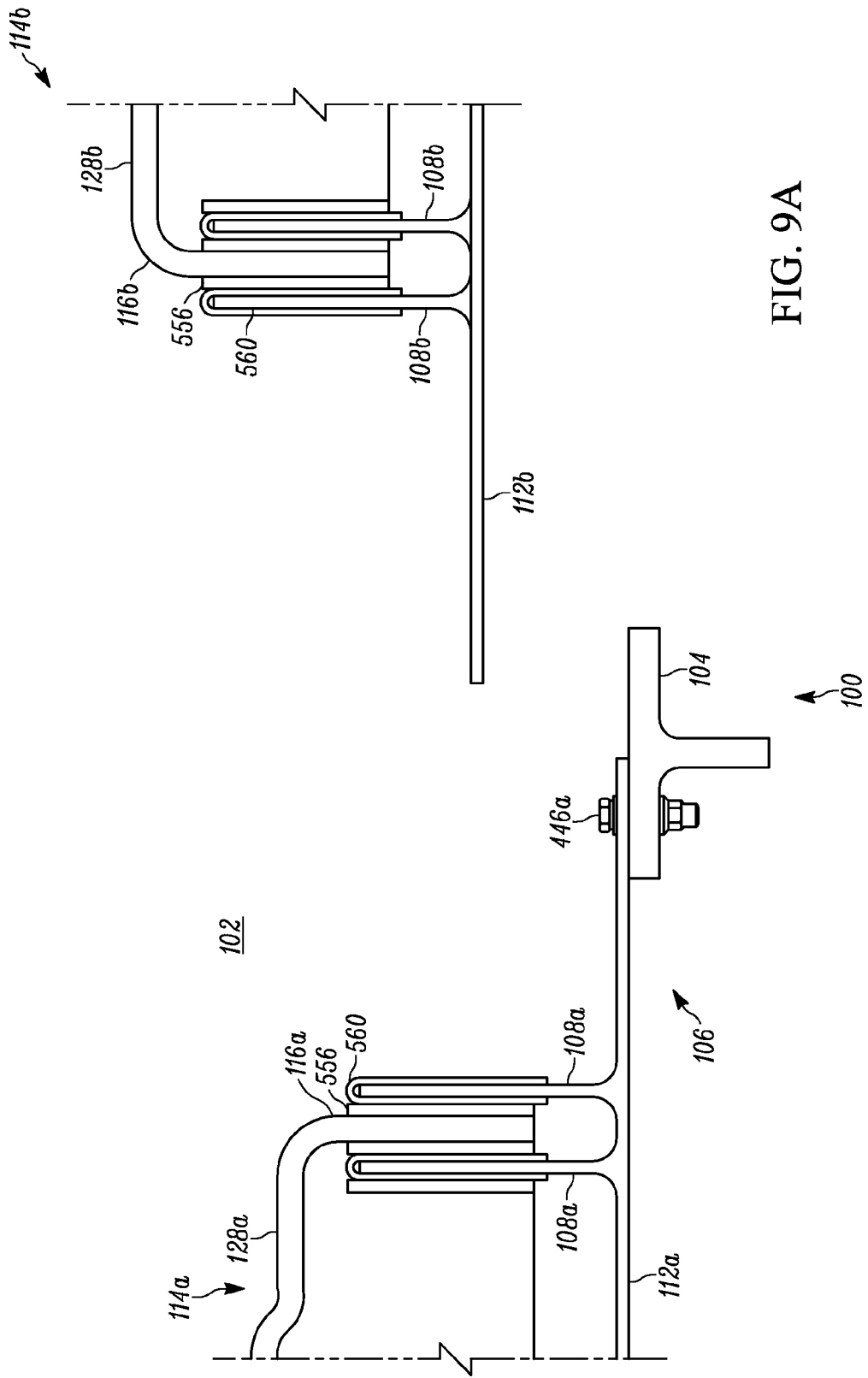
FIGS. 9A-9C schematically depict a sequence of installation of the aspect of FIG. 1.
Figure 9B:
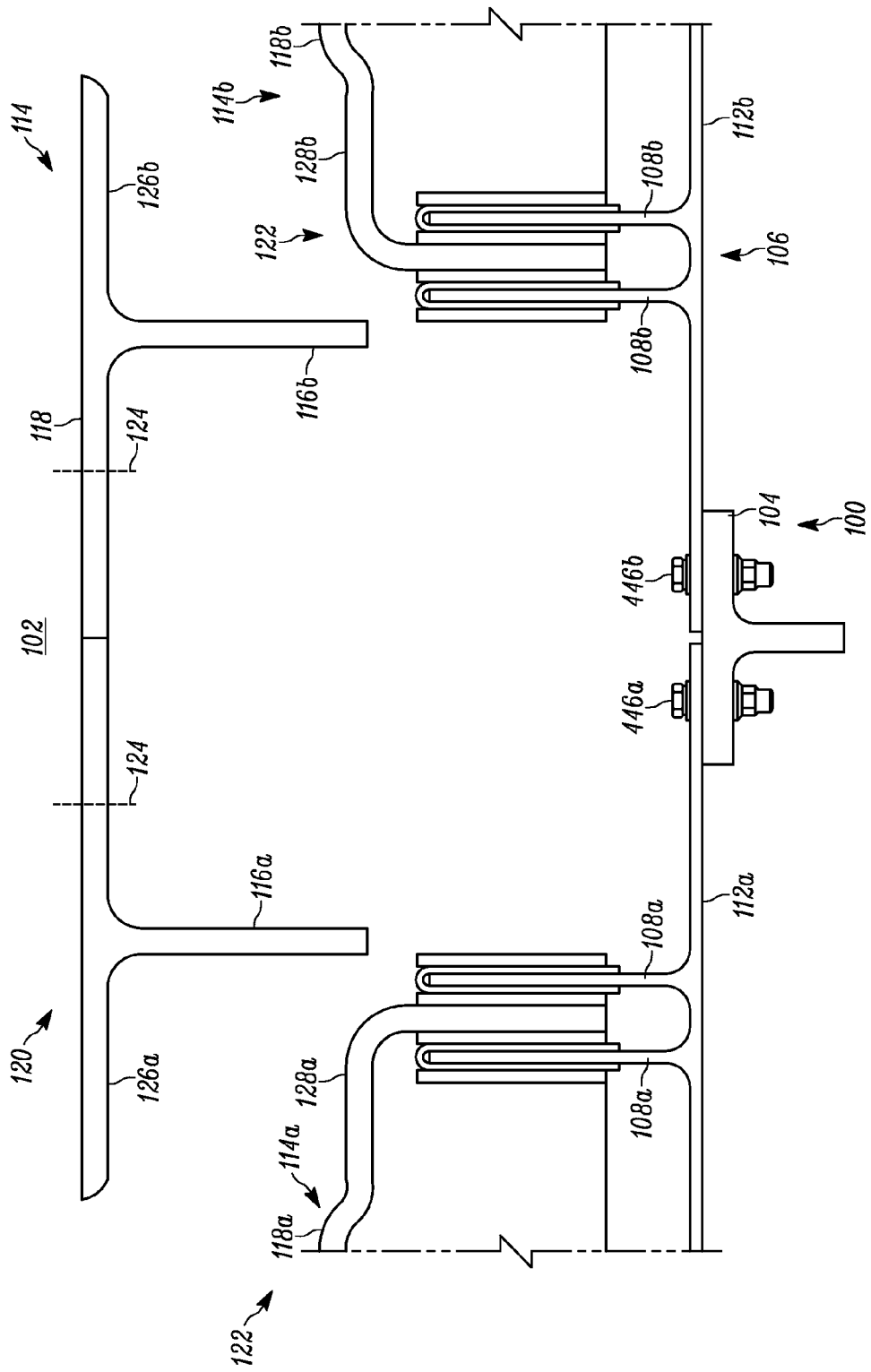
Figure 9C:
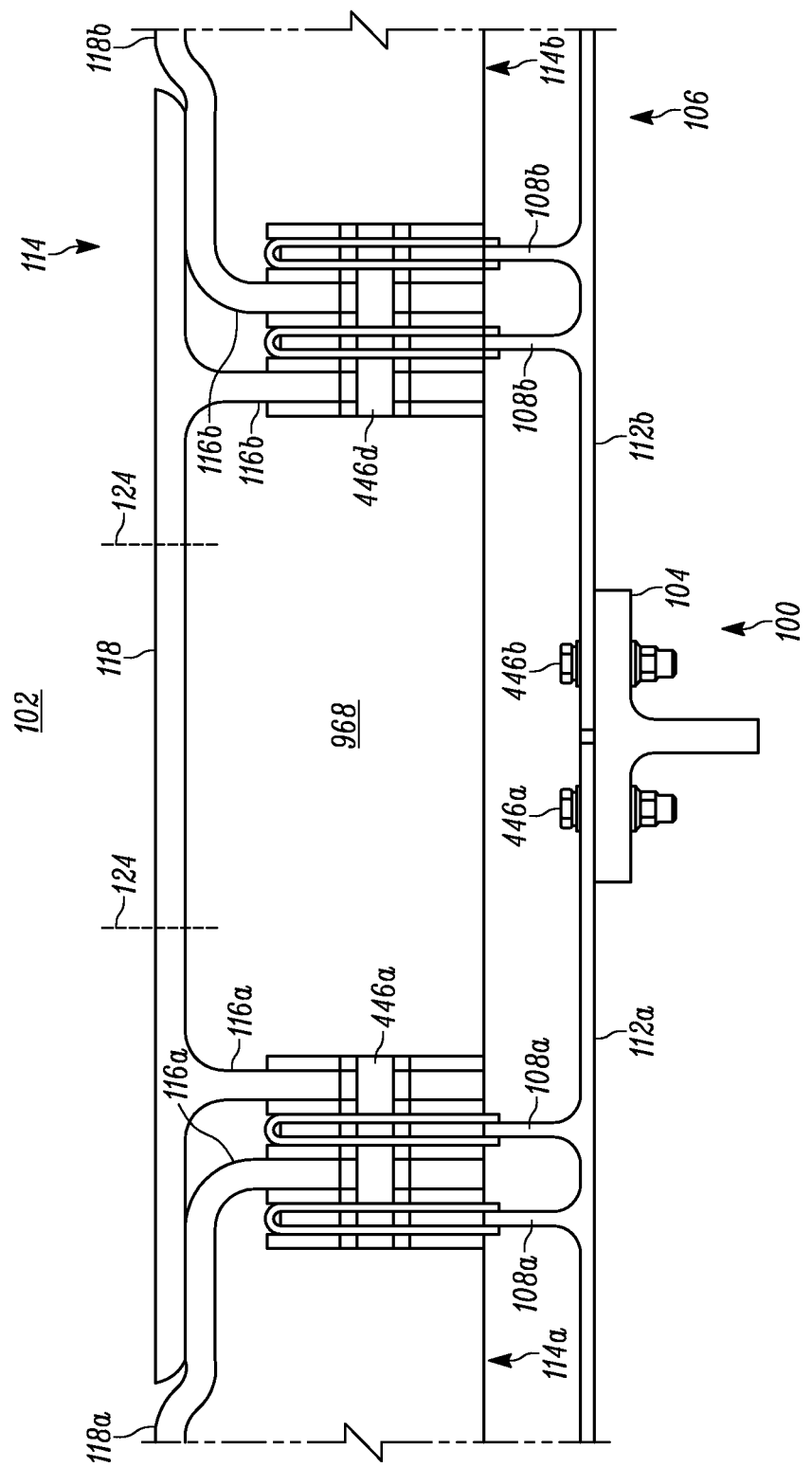

FIGS. 9A-9C depict an example sequence of operation of an installation of the TPS 100. In FIG. 9A, a first inner mold line side base 112a of a first inner mold line side assembly 106a has been fastened to a substructure 104 with a fastener 446a. That is, the substructure 104 could be selectively connected (e.g., via at least one fastener 446a) with a portion of the inner mold line side assembly 106a spaced apart from the plurality of clevises 108a to place the inner mold line side assembly 106a in an operative configuration. As an example, the substructure 104 could be an outer surface of an aircraft that is desirably protected from ambient temperatures.

The first inner mold line side base 112a has a plurality of clevises 108a extending longitudinally upward. As shown in FIG. 9A, a first outer mold line side assembly 114a, having a first shoulder 128a has already been assembled with the first inner mold line side assembly 106a, though the assembly can be conducted in any desired sequence. It is contemplated that a plurality of each of the inner and outer mold line side assemblies 106 and 114 could be assembled together into a complete TPS 100, and that the mutual interconnections of the inner and outer mold line side assemblies 106 and 114, and connections to the substructure 104 for a single TPS 100 could occur in various sequences/orders, depending upon desired orders of assembly for particular areas of the TPS 100.

As shown in FIG. 9A, second inner and outer mold line side assemblies 106b and 114b are shown as having been previously connected, and are shown in the process of being lowered down onto the substructure 104 in this Figure.

Turning to FIG. 9B, a fastener 446b has been installed to connect the second inner and outer mold line side assemblies 106b and 114b to the substructure 104. In FIG. 9B, the depicted portions of the first and second outer mold line side assemblies 114a and 114b are second outer mold line parts 122 having shoulders 128a and 128b, respectively. FIG. 9B therefore shows a first outer mold line part 120 having wings 126a and 126b which are being shown as engaging the shoulders 128a and 128b to place the outer mold line side assemblies 114a and 114b into an operative configuration with the horizontally oriented shoulders 128a and 128b of the second outer mold line parts 122a and 122b and the at least one horizontally oriented wings 126a and 126b of the first outer mold line part 120 being longitudinally interposed between the ambient space 102 and the inner mold line side assembly 106.

Optionally, and as shown in dotted lines at 124 in FIGS. 9B-9C, an aperture 124 could be provided to the first outer mold line part 120 to facilitate access to an inner chamber 968 which is otherwise inaccessible from the ambient space 102 when the TPS 100 is assembled as shown in FIG. 9C. While the dashed lines depict one optional location of an aperture 124 permitting selective access to the inner mold line side assembly 106 and other components of the inner chamber 968, it is contemplated that the aperture 124 in FIGS. 9B-9C could be present in the three-dimensional structures depicted, but could simply be located in a portion of the depicted structures which is not included in the limited cross-sectional view shown (e.g., if the cross-section in FIGS. 9A-9C were to be taken in an area similar to line X-X in FIG. 4, which is not necessarily the case here).

In FIG. 9B, each of the lugs 116a and 116b of the outer mold line side assembly 114 is being lowered down to be placed laterally adjacent at least one clevis 108a and 108b. Accordingly, as shown in FIG. 9C, fasteners 446c and 446d have been placed (optionally with the assistance of a tool or other manipulator accessing the inner chamber 968 via an aperture 124 not specifically depicted here) horizontally through the clevises 108a, 108b and the lugs 116a, 116b, which are laterally adjacent to one another. This connection, as shown in the assembled view of FIG. 9C, selectively secures the outer mold line side assembly 114 to the inner mold line side assembly 106. When an aperture 124 has been used to assist with the fastener placement, a plug (not shown in FIG. 9C) may be placed to selectively occlude the aperture and prepare the TPS 100 for operation. For example, the plug 130 may be provided with an adhesive 236 (e.g., a caulked bottom surface) to assist with holding the plug 130 in place within the aperture 124 and thus presenting a relatively smooth and uninterrupted outer mold line cover 118 surface to the ambient space 102.

In operation of the installed TPS 100, at least one of the plug 130, the connection between the outer mold line side assembly 114 and the inner mold line side assembly 106, and the relative positioning of the lugs 116 and clevises 108 may be operative to prevent thermal energy transfer between the substrate 104 and the ambient space 102. For example, the inner mold line side assembly 106 and outer mold line side assembly 114 may cooperatively insulate the substructure 104 from heat developed in the ambient space 102 during flight when the substructure 104 is an aircraft.

While the plugs 130, 130' and various components thereof are referred to as "cylindrical" above for ease of description, it is contemplated that the geometric particulars of the plug/aperture relationship are not limited to cylindrical or circular arrangements, but could instead be, in any plane(s) or orientation(s), rectilinear, curvilinear, curved, or have any other suitable shape. However, for most use applications of the TPS 100, it will be desirable for the aperture 124 and plug(s) 130, 130' to have complementary shapes in order to achieve a relatively snug fit therebetween.

It is contemplated that solid, liquid, foam, pellets, and/or other desired type(s) of insulating material (not shown) could be provided to one or more of the inner chamber(s) 968 or any other area of the TIPS 100, in any desired manner. Such insulating material may work in conjunction with any other features/structures described herein to assist with providing desired heat transfer and/or insulating properties for a particular use environment.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components, other than as noted, could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A thermal protection system, comprising:
an inner mold line side assembly for selective connection with a substructure, the inner mold line side assembly having a plurality of clevises extending longitudinally in a first direction when connected to the substructure;
an outer mold line side assembly oppositely disposed to the inner mold line side assembly, the outer mold line side assembly being selectively connected to the inner mold line side assembly in an operative configuration, the outer mold line side assembly having a plurality of lugs extending in a second direction, opposite the first direction, the lugs each being configured for selective placement laterally adjacent the clevises in the operative configuration, and the outer mold line side assembly including a first outer mold line part and a second outer mold line part, the first outer mold line part having an aperture extending longitudinally therethrough and permitting selective access to the inner mold line side assembly, the first outer mold line part including at least one horizontally oriented wing configured to selectively engage horizontally oriented shoulders of the second outer mold line part;

a plug substantially filling the aperture of the first outer mold line part in an operative configuration, the plug being selectively secured to the inner mold line side assembly; and a fastener extending horizontally through the clevises and the lugs, when laterally adjacent to one another, the fastener being configured to selectively secure the outer mold line side assembly to the inner mold line side assembly.

2. The thermal protection system of claim 1, wherein the horizontally oriented wing of the first outer mold line part and horizontally oriented shoulders of the second outer mold line part, when engaged, are configured such that the first outer mold line part and second outer mold line part collectively provide the outer mold line side assembly with a substantially planar outermost outer mold line assembly surface.

3. The thermal protection system of claim 1, wherein the plug is selectively frangibly connected to the inner mold line side assembly.

4. The thermal protection system of claim 1, wherein each of the clevises is substantially planar and has longitudinally extending, laterally spaced, and oppositely facing first and second clevis faces, each of the lugs is substantially planar and has longitudinally extending, laterally spaced, and oppositely facing first and second lug faces, and wherein, when laterally adjacent to one another, the clevises and lugs are arranged with a chosen one of the first and second clevis faces laterally adjacent to a chosen one of the first and second lug faces.

5. The thermal protection system of claim 4, wherein a plurality of clevises and lugs are mutually interleaved with a chosen one of the first and second clevis faces of a selected clevis being laterally adjacent to a second lug face of a first lug while an other one of the first and second clevis faces of the selected clevis is laterally adjacent to a first lug face of a second lug.

6. The thermal protection system of claim 5, wherein insulating surfaces are interposed laterally between the clevises and the lugs to substantially prevent mutual contact therebetween.

7. The thermal protection system of claim 6, wherein the insulating surfaces comprise a monolithic unitary M-clip.

8. The thermal protection system of claim 1, wherein, when laterally adjacent to one another in the operative configuration, the clevises are spaced apart from direct contact with the outer mold line side assembly and the lugs are spaced apart from direct contact with the inner mold line side assembly.

9. The thermal protection system of claim 1, including a first damping structure interposed longitudinally between, and directly contacting both of, the substructure and the inner mold line side assembly, and a second damping structure interposed longitudinally between the inner mold line side assembly and the outer mold line side assembly, the second damping structure directly contacting the inner mold line side assembly.

10. A method of thermally insulating a substructure from an ambient space, the method including:
providing an inner mold line side assembly having a plurality of clevises extending longitudinally in a first direction;
selectively connecting the substructure with a portion of the inner mold line side assembly spaced apart from the plurality of clevises to place the inner mold line side assembly in an operative configuration;
providing an outer mold line side assembly having a plurality of lugs extending in a second direction, opposite the first direction, the outer mold line side assembly including a first outer mold line part and a second outer mold line part, the first outer mold line part having an aperture extending longitudinally therethrough, the first outer mold line part including at least one horizontally oriented wing, and the second outer mold line part including a plurality of horizontally oriented shoulders;
placing the outer mold line side assembly in opposite disposition to the inner mold line side assembly and engaging the horizontally oriented shoulders of the second outer mold line part with at least one horizontally oriented wing of the first outer mold line part to place the outer mold line side assembly in the operative configuration with the horizontally oriented shoulders of the second outer mold line part and the at least one horizontally oriented wing of the first outer mold line part being longitudinally interposed between the ambient space and the inner mold line side assembly;
with the aperture extending through the first outer mold line part, permitting selective access to the inner mold line side assembly when the outer mold line side assembly is in the operative configuration;
substantially filling the aperture of the first outer mold line part with a plug to selectively block access to the inner mold line side assembly through the aperture, the plug being selectively secured to the inner mold line side assembly;
placing each of the lugs laterally adjacent at least one clevis;
connecting the outer mold line side assembly to the inner mold line side assembly; and
extending a fastener horizontally through a plurality of the clevises and the lugs, when laterally adjacent to one another, to selectively secure the outer mold line side assembly to the inner mold line side assembly;
wherein at least one of the plug, the connection between the outer mold line side assembly and the inner mold line side assembly, and the relative positioning of the lugs and clevises is operative to prevent thermal energy transfer between the substrate and the ambient space.

11. The method of claim 10, wherein the inner mold line side assembly and outer mold line side assembly cooperatively insulate the substructure from heat developed in the ambient space.

12. The method of claim 10, wherein placing the outer mold line side assembly in opposite disposition to the inner mold line side assembly and engaging the horizontally oriented shoulders of the second outer mold line part with at least one horizontally oriented wing of the first outer mold line part includes collectively providing, via cooperation of the horizontally oriented shoulders of the second outer mold line part and at least one horizontally oriented wing of the first outer mold line part, the outer mold line side assembly with a substantially planar outermost outer mold line assembly surface.

13. The method of claim 10, wherein substantially filling the aperture of the first outer mold line part with a plug includes selectively frangibly connecting the plug to the inner mold line side assembly.

14. The method of claim 10, wherein providing the inner and outer mold line side assemblies includes:
providing each of the clevises as being substantially planar and having longitudinally extending, laterally spaced, and oppositely facing first and second clevis faces providing each of the lugs as being substantially planar and having longitudinally extending, laterally spaced, and oppositely facing first and second lug faces; and arranging, when laterally adjacent to one another, the clevises and lugs with a chosen one of the first and second clevis faces laterally adjacent to a chosen one of the first and second lug faces.

15. The method of claim 14, including mutually interleaving a plurality of clevises and lugs, with a chosen one of the first and second clevis faces of a selected clevis being laterally adjacent to a second lug face of a first lug while an other one of the first and second clevis faces of the selected clevis is laterally adjacent to a first lug face of a second lug.

16. The method of claim 15, including substantially preventing mutual contact between the clevises and the lugs by interposing insulating surfaces laterally therebetween.

17. The method of claim 10, including spacing the clevises apart from direct contact with the outer mold line side assembly and spacing the lugs apart from direct contact with the inner mold line side assembly when the clevises and lugs are laterally adjacent to one another in the operative configuration.

18. The method of claim 10, including:
interposing a first damping structure longitudinally between, and directly contacting both of, the substructure and the inner mold line side assembly; and
interposing a second damping structure longitudinally between the inner mold line side assembly and the outer mold line side assembly, the second damping structure directly contacting the inner mold line side assembly.

19. A system for restricting thermal transfer between an ambient space and an outer surface of an aircraft, the system comprising:
a substantially planar inner mold line side surface, the inner mold line side surface being attached to the outer surface of the aircraft;
a plurality of clevises extending longitudinally upward from the inner mold line side surface;
a substantially planar outer mold line side surface, the outer mold line side surface being longitudinally interposed between the ambient space and at least a portion of the inner mold line side surface, the outer mold line side surface being at least partially comprised of at least one horizontally oriented wing and a plurality of horizontally oriented shoulders, the at least one horizontally oriented wing selectively engaging at least two of the horizontally oriented shoulders;
a plurality of lugs extending longitudinally downward from the outer mold line side surface, each lug being directly laterally adjacent at least one clevis;
at least one aperture extending longitudinally through the outer mold line side surface, the aperture selectively permitting fluid communication between the ambient space and the inner mold line side surface;
a plug selectively substantially filling the aperture, the plug being selectively secured to the inner mold line side surface; and
a fastener extending horizontally through the clevises and the lugs, when laterally adjacent to one another, the fastener being configured to selectively secure the outer mold line side surface to the inner mold line side surface.

20. The system of claim 19, wherein the plug is selectively frangibly connected to the inner mold line side assembly.

21. The system of claim 19, wherein insulating surfaces are interposed laterally between the clevises and the lugs to substantially prevent mutual contact therebetween.

22. The system of claim 19, including a first damping structure interposed longitudinally between, and directly contacting both of, the substructure and the inner mold line side surface, and a second damping structure interposed longitudinally between the inner mold line side surface and the outer mold line side surface, the second damping structure directly contacting the inner mold line side surface.

* * * * *